United States Patent [19]
Brundage et al.

[11] Patent Number: 5,442,875
[45] Date of Patent: * Aug. 22, 1995

[54] NET APPARATUS

[76] Inventors: David A. Brundage, 2604 Campden Dr., Austin, Tex. 78745; Jerry E. Jones, 12502 Red Mesa Hollow, Austin, Tex. 78739

[*] Notice: The portion of the term of this patent subsequent to Aug. 23, 2011 has been disclaimed.

[21] Appl. No.: 227,203

[22] Filed: Apr. 13, 1994

Related U.S. Application Data

[63] Continuation-in-part of Ser. No. 124,910, Sep. 21, 1993, Pat. No. 5,339,557.

[51] Int. Cl.$^6$ .............................................. A01K 77/00
[52] U.S. Cl. .............................................. 43/11; 43/7
[58] Field of Search ................. 43/7, 11; 210/471; 119/201, 213, 247, 216, 223; 132/274

[56] References Cited

U.S. PATENT DOCUMENTS

| | | |
|---|---|---|
| 574,986 | 1/1897 | Dreifbach . |
| 2,293,800 | 8/1942 | Brown . |
| 2,595,597 | 5/1952 | Morseth . |
| 2,604,715 | 7/1952 | Brown, Jr. . |
| 2,741,053 | 4/1956 | Moore . |
| 2,783,573 | 3/1957 | Rau . |
| 3,747,250 | 7/1973 | Willinger . |
| 3,849,926 | 11/1974 | Fox . |
| 4,029,050 | 6/1977 | Genest . |
| 4,034,710 | 7/1977 | Carter . |
| 4,118,807 | 10/1978 | McCauley . |
| 4,125,956 | 11/1978 | Killian . |
| 4,138,790 | 2/1979 | Schmucker . |
| 4,932,150 | 6/1990 | Sher . |
| 5,099,597 | 3/1992 | Whistle . |

*Primary Examiner*—Kurt Rowan
*Attorney, Agent, or Firm*—Skjerven, Morrill, MacPherson, Franklin & Friel; Andrew C. Graham

[57] ABSTRACT

A net apparatus for catching aquatic animals includes in a preferred embodiment a substantially transparent monofilament netting attached to a substantially transparent, hollow, tubular rim, which is attached to a substantially transparent, hollow, tubular handle. One or more openings allows water to flow into the hollow interior of both the rim and the handle when immersed underwater. The handle includes two openings for receiving the two ends of the rim. An elliptical cross-section of both the rim and the openings in the handle afford assembly of the dip net apparatus by inserting the ends of the rim into the corresponding handle openings and friction locking the rim to the handle by twisting the rim relative to the handle.

30 Claims, 13 Drawing Sheets

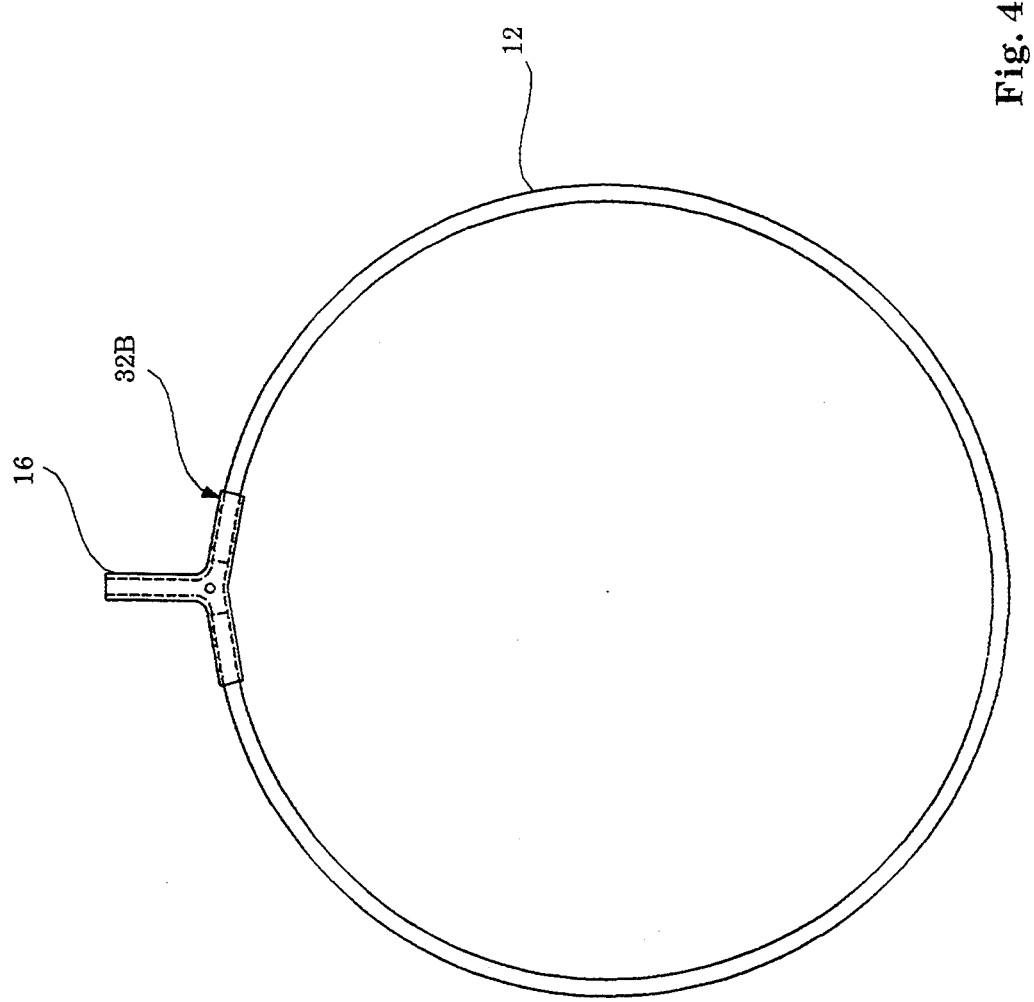

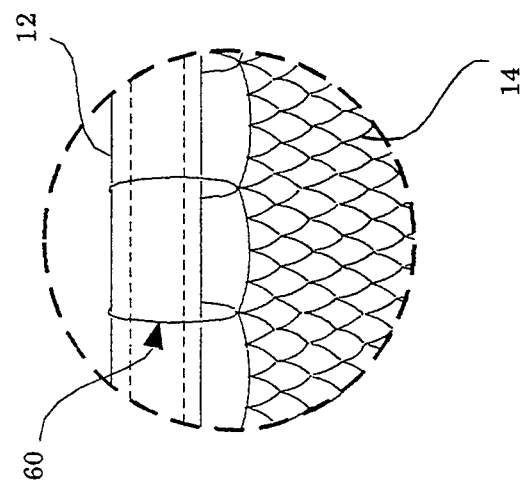
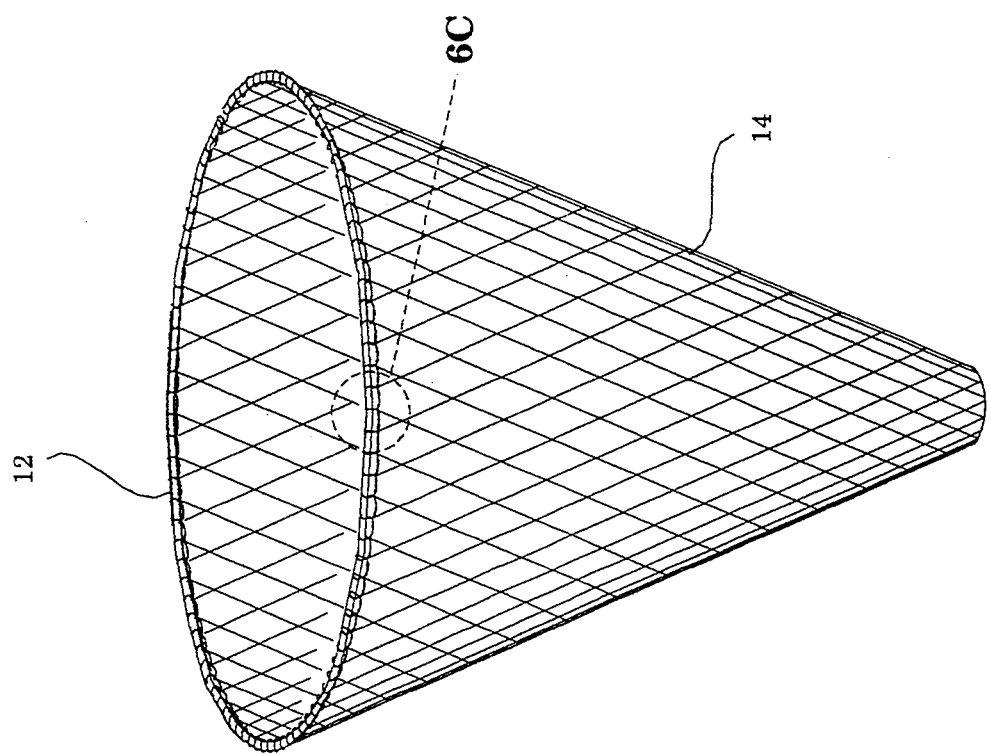

NET APPARATUS

CROSS-REFERENCE TO RELATED APPLICATION

This application is a continuation-in-part of commonly-owned application Ser. No. 08/124,910, filed Sep. 21, 1993, naming David A. Brundage and Jerry E. Jones as co-inventors, now U.S. Pat. No. 5,339,557.

BACKGROUND OF THE INVENTION

1. Field of the Invention

This invention relates to fishing nets, and more specifically, to recreational dip nets typically used to catch bait fish and other aquatic animals.

2. Description of Related Art

The art of dip nets for catching aquatic animals, such as fish, extends well back in time. A great many examples of dip nets can be found which exhibit a variety of construction techniques for connecting a rim to a handle and for connecting a net to the rim. Aluminum, wood, and fiberglass are frequently used for the rim and the handle, with small metallic hardware frequently used to connect the rim to the handle. Consequently, hand tools are typically required to change the net or to assemble the rim to the handle. Colored netting material, such as colored nylon, is frequently used.

SUMMARY OF THE INVENTION

Typical dip nets are visible in the water to the fish. The visibility of the dip net hinders the intended purpose of the net by appearing as a foreign object or predator to the fish. When a typical dip net is brought near a group of fish, they become aware of it and usually swim around or away from it. This awareness arises from one or more features of typical dip nets, including the material, shape, and color of the handle and rim, the hardware used to attach the rim to the handle, and the material, color, and construction of the net. Commonly used materials are opaque and reflect light when underwater, thus providing an undesirable contrast with the ambient water coloration. Also, the hardware frequently used to connect the rim to the handle is very often easily visible underwater, and further, requires the use of hand tools to change the net or to assemble the rim to the handle.

It is an object of the present invention to provide a dip net apparatus which appears non-threatening to nearby fish.

It is a further object of the present invention to provide a frame, which is non-threatening to nearby fish, to which a net may be attached.

It is a further object of the present invention to provide a net suitable for attachment to a dip net frame, which is non-threatening to nearby fish.

It is a further object of the present invention to provide a dip net apparatus which is easily assembled and disassembled for convenient storage.

Accordingly, in one embodiment of the present invention, an apparatus for supporting a net includes a frame having a substantial portion thereof substantially non-opaque.

In another embodiment of the current invention, a net apparatus includes a frame having at least a rim portion, and a net attached to the rim portion of the frame. A substantial portion of the rim portion of the frame is substantially non-opaque.

In yet another embodiment of the current invention, a dip net apparatus includes an elongated handle having a longitudinal axis, a rim removably attached to the handle, and a net removably attached to the rim. A substantial portion of the rim is substantially non-opaque.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

FIG. 1 is an isometric view of a dip net apparatus in accordance with the current invention;

FIG. 4 is a frontal view of the rim of the dip net apparatus inserted into the Y-connector shown in FIG. 2;

FIG. 6A is an isometric view of the net as attached to the rim of the dip net apparatus of FIG. 1;

FIG. 6C shows a detail of one embodiment of the attachment of the net to the rim of the dip net apparatus of FIG. 6A;

DETAILED DESCRIPTION OF THE PREFERRED EMBODIMENTS

Referring to FIG. 1, a dip net apparatus in accordance with the current invention includes a handle 10, a rim 12 attached to the handle 10, and a net 14 connected to and suspended from the rim 12.

Figure 2:
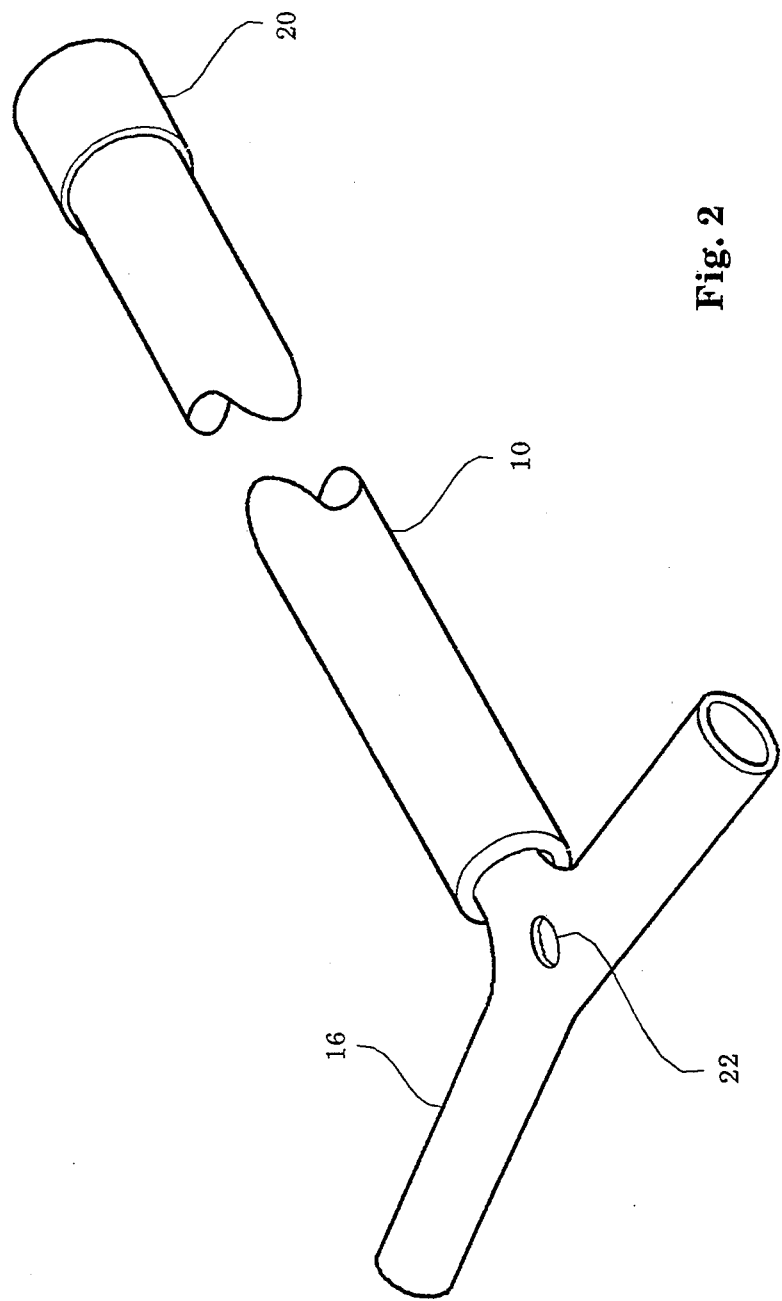
FIG. 2 is an isometric view of a Y-connector attached to the handle of the dip net apparatus shown in FIG. 1, for attaching the rim of the dip net apparatus to the handle.
Figure 3:
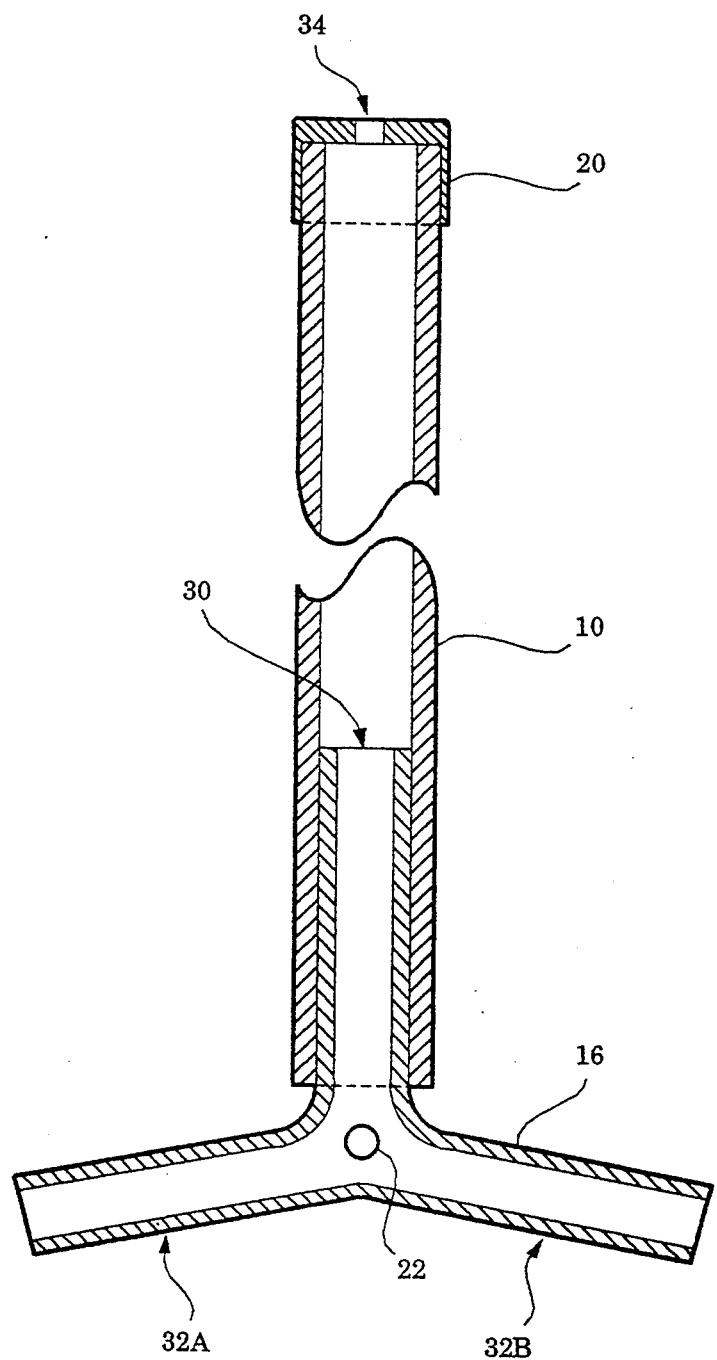

A more detailed view of the handle 10 is shown in FIG. 2 and which figure also shows a Y-connector 16 attached to the handle 10 for connecting the rim 12 thereto. The handle 10 is preferably constructed from a substantially transparent tubular material, but is advantageously constructed from a non-opaque material. A non-opaque material may range from partially light transmissive (generally known as translucent) to fully light transmissive (generally known as transparent). An end cap 20 covers one open end of the handle 10, while the Y-connector 16 is attached to the opposite end of the handle 10. The Y-connector 16 is preferably constructed from a similar substantially-transparent material and has three hollow, tubular legs shaped roughly in a Y-shaped fashion. A hole 22 provides an opening into the hollow interior of the Y-connector 16. Both the handle 10 and the Y-connector 16 are preferably fashioned using polycarbonate material, including UV-treated polycarbonate, but plexiglas and acrylic plastic may also be used to advantage. Alternatively, the y-connector 16 and handle 10 may be formed together as a single unit, by using, for example, an injection molding, casting, or other suitable process.

Figure 3:
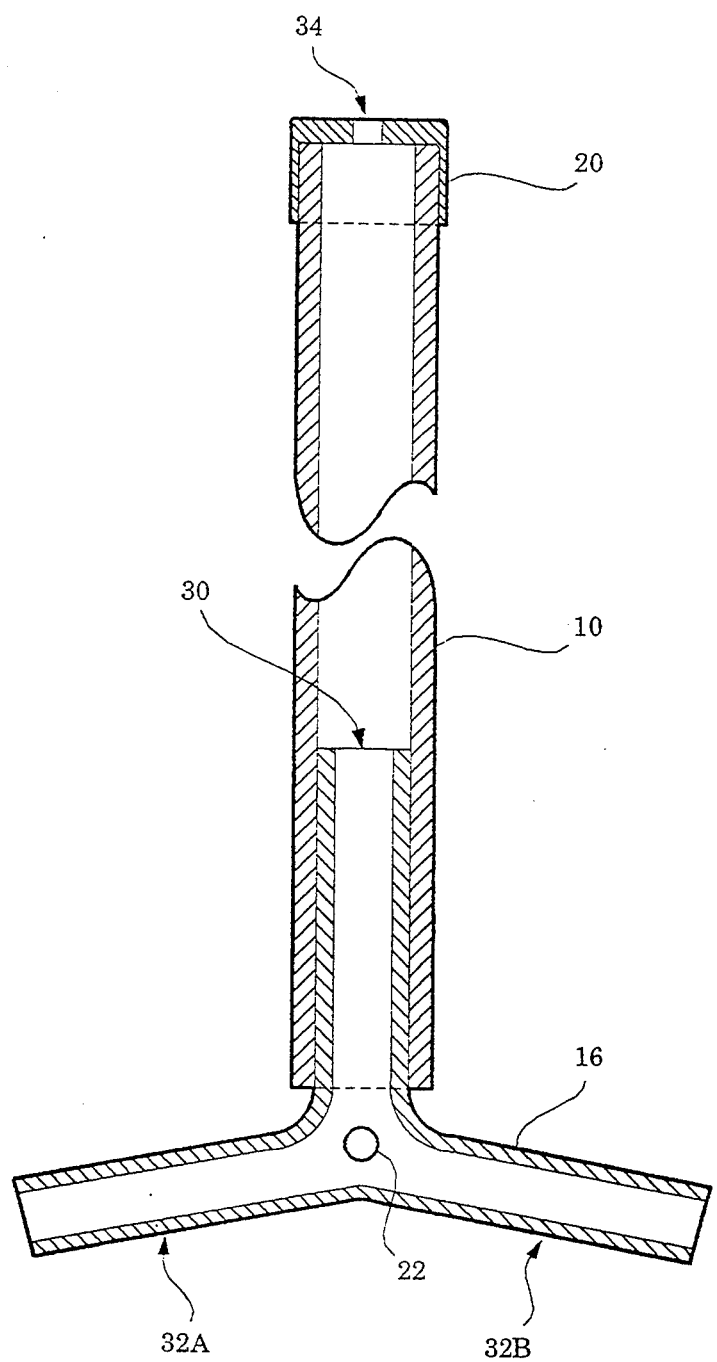
FIG. 3 is a cross-sectional view of the Y-connector as attached to the handle, as shown in FIG. 2.

A cross-sectional view of the handle 10 and Y-connector 16 is shown in FIG. 3. The central leg 30 of the Y-connector 16 extends partially within the hollow handle 10 and may be permanently attached by a solvent or may be removable, as with a friction fitting or some other suitable means of attachment. This leaves the remainder of the handle 10 available for storing the rim 12 when disassembled, as will be discussed hereinafter.

The side legs 32A and 32B of Y-connector 16 are sized to receive the rim 12, as is shown in FIG. 4. The rim 12 is preferably constructed from a substantially-transparent, flexible, hollow tubing, such as polycarbonate, but in no way is limited to such a choice. To assemble, the rim 12 is bent into a circular shape and inserted into the side legs 32A and 32B of the Y-connector 16. By using such a flexible material, the rim is not permanently deformed when dented in use due to rough handling, but instead returns to its original shape.

Figure 5A:
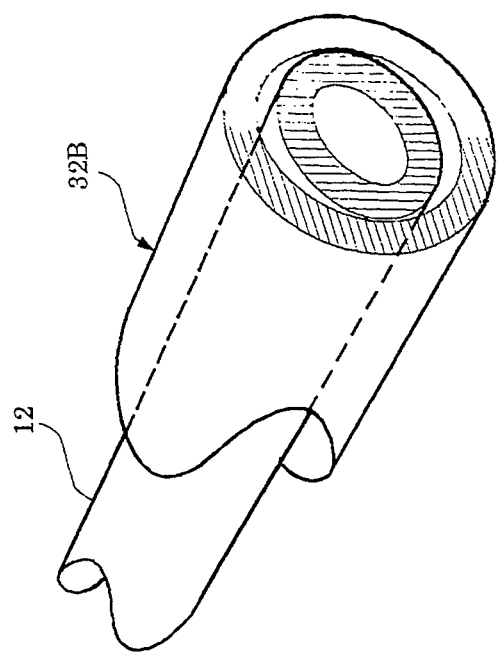
FIGS. 5A and 5B are cross-sectional views of the rim inserted into the Y-connector as shown in FIG. 2, in unlocked and locked positions, respectively.
Figure 5B:
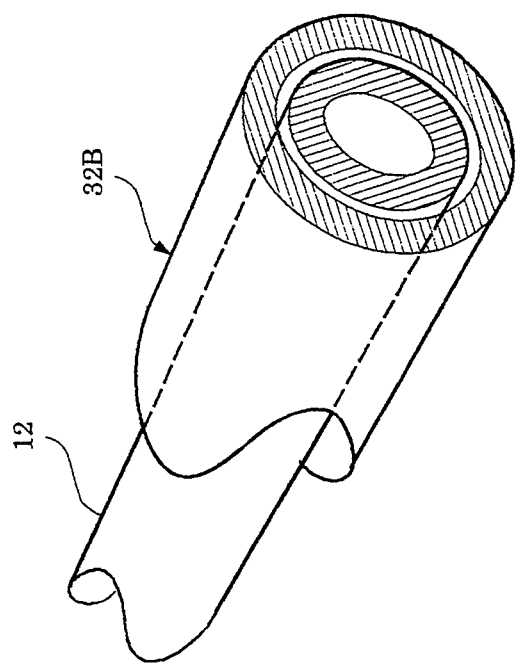

A cross-sectional view of the rim 12 as inserted into side leg 32B is shown in FIG. 5A. The out-of-round cross-sectional shape of both the side legs 32A and 32B and the rim 12 provide for locking the rim 12 into the side legs 32A and 32B by twisting the rim 12, as is shown in FIG. 5B. Alternatively, the rim 12 may be sized to more nearly fit the inside dimensions of the side legs 32A and 32B where the natural torsion of the rim 12 when bent and inserted provides sufficient force to retain the rim 12 within the side legs. No hand tools nor any small piece parts are required to lock the rim 12 to the Y-connector 16. The out-of-round shape is preferably an elliptical shape, although a variety of other similar shapes (e.g., egg-shaped, square, rectangular) may be advantageously used. Furthermore, a wide variety of cross-sectional shapes are useful, including a circular shape, particularly if locking pins or other locking hardware are used.

Figure 6D:
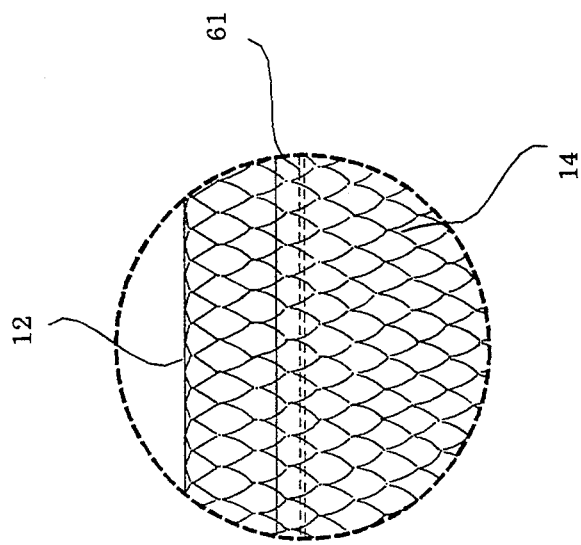
FIG. 6D shows a detail of an alternative embodiment of the attachment of the net to the rim of the dip net apparatus of FIG. 6B.
Figure 6B:
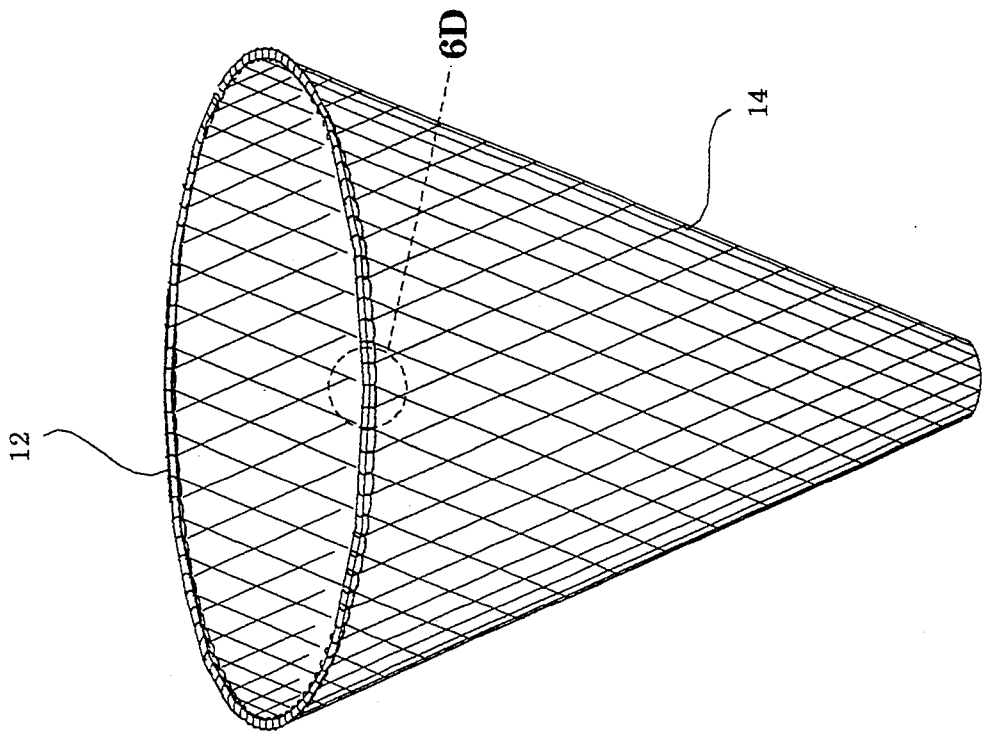
FIG. 6B is an isometric view of the net as attached to the rim of the dip net apparatus of FIG. 1.

FIGS. 6A and 6B are isometric views of the net as attached to the rim of the dip net apparatus of FIG. 1. FIG. 6C shows a preferred embodiment of a netting arrangement for use with the dip net apparatus as shown in FIG. 6A. As indicated, the rim 12 is inserted through a sleeve of net loops 60 to attach the net 14 to the rim 12. The net loops 60 are spaced at a distance typically larger than the mesh spacing of the net 14, thus minimizing the visibility of the net 14 against the rim 12. Also, the mesh spacing of the net 14 is preferably equal to approximately $\frac{1}{8}$ of an inch. It is believed that such a mesh size is less threatening to nearby fish, and may even be enticing to the fish. The net 14 preferably uses a non-opaque netting material. For example, a plastic netting material using pure plastic resins with no added coloration is preferred, including some polypropylene and nylon formations. Furthermore, the net 12 preferably uses a monofilament netting material. Such a material is supple, doesn't mildew, and is light-weight even when wet. Furthermore, when underwater, its visual character apparently poses little threat to nearby fish, as frequently they swim right into a net fashioned from such a material.

FIG. 6D shows an alternative embodiment of a netting arrangement for use with the dip net apparatus as shown in FIG. 6B. As indicated, to attach the net 14 to the rim 12, the rim 12 is inserted through a sleeve of folded netting material secured by a stitched seam 61. A seam may also be formed by "heat welding" rather than by stitching.

When the assembled dip net apparatus thus far described is immersed underwater, the hollow interiors of the handle 10, the Y-connector 16, and the rim 12 each fill with water as a result of the hole 22 within the Y-connector 16. The hole 34 in the end cap 20 provides an air escape as the water fills the interior of the handle. This virtually renders the dip net apparatus visually non-threatening to nearby fish, as the coloration of the rim and handle assumes the coloration of the ambient water. In use, fish typically swim directly into such a dip net apparatus, as contrasted to previous nets, which fish will typically swim around or away from.

Figure 7:
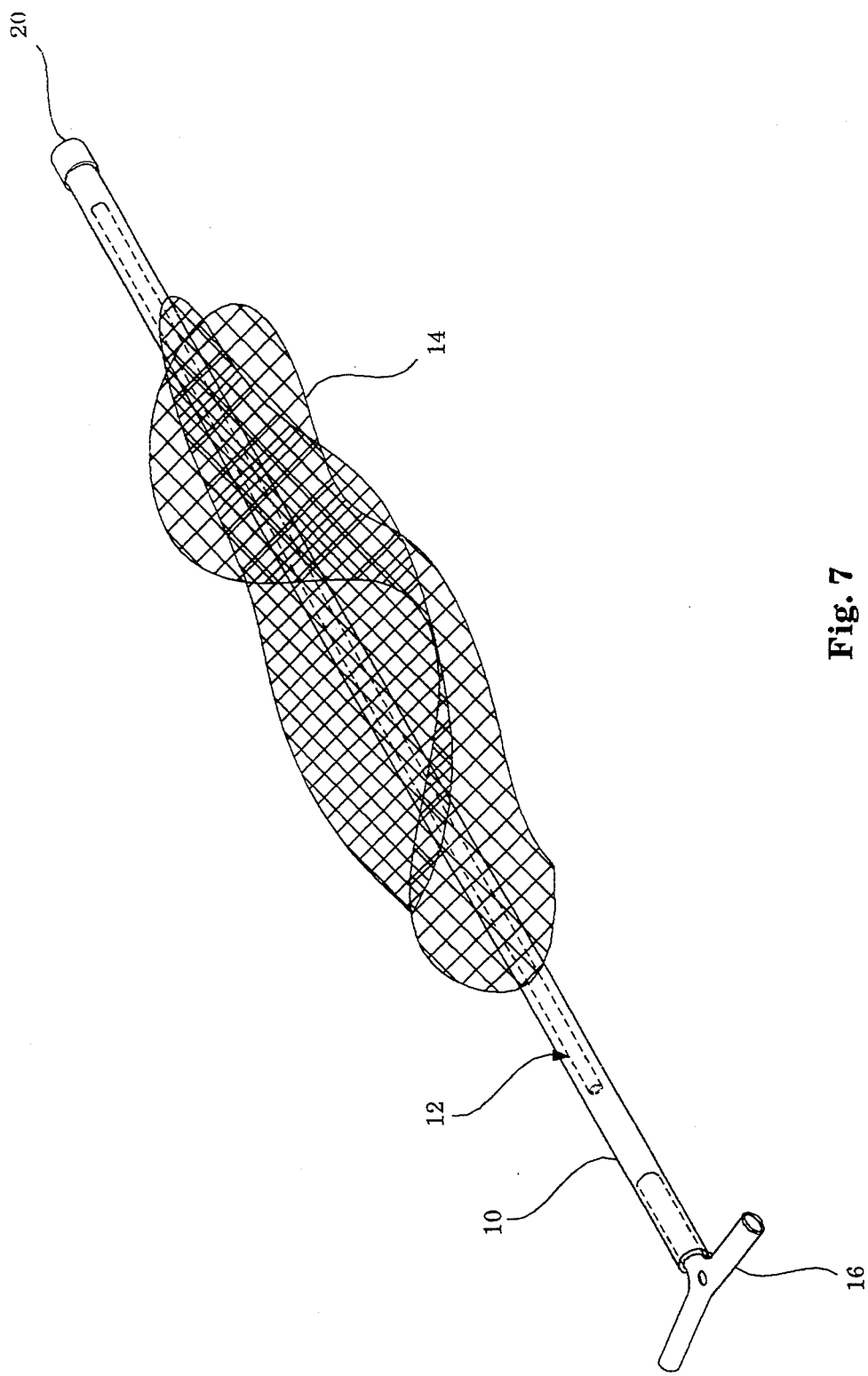
FIG. 7 is an isometric view of the dip net apparatus of FIG. 1, showing the disassembled rim stored within the handle and the unattached net wrapped around the handle for storage.

FIG. 7 illustrates a disassembled dip net apparatus as in FIG. 1. The rim 12 is stored within the hollow tubular handle 10, with the end cap 20 preventing the rim 12 from falling out. The net 14 is wrapped around the handle 10, providing a compact structure for easy storage.

Figure 8:
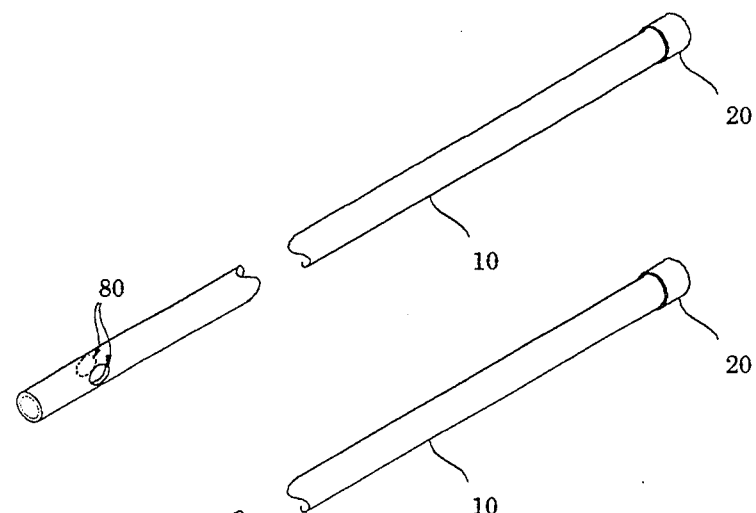
FIG. 8 is an isometric view showing an alternative embodiment of the handle for connecting the rim thereto for a dip net apparatus as shown in FIG. 1.

FIG. 8 illustrates an alternative embodiment for connecting the rim 12 to the handle 10. Two out-of-round (e.g., elliptical) holes 80 are fashioned in the tubular wall of the handle 10 to provide locking connection points for both ends of the rim 12.

Figure 9:
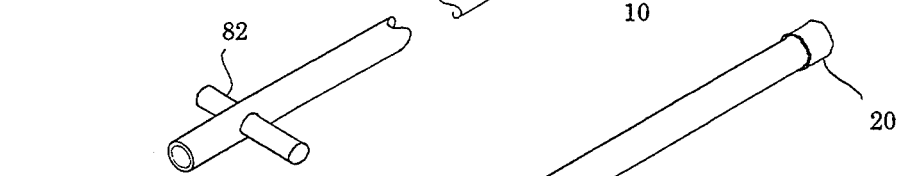
FIG. 9 is an isometric view showing a second alternative embodiment of the handle for connecting the rim thereto for a dip net apparatus as shown in FIG. 1.

FIG. 9 illustrates a second alternative embodiment for connecting the rim 12 to the handle 10. An elliptical tube 82 is inserted through and attached to the tubular wall of the handle 10 to provide locking connection points for both ends of the rim 12.

Figure 10:
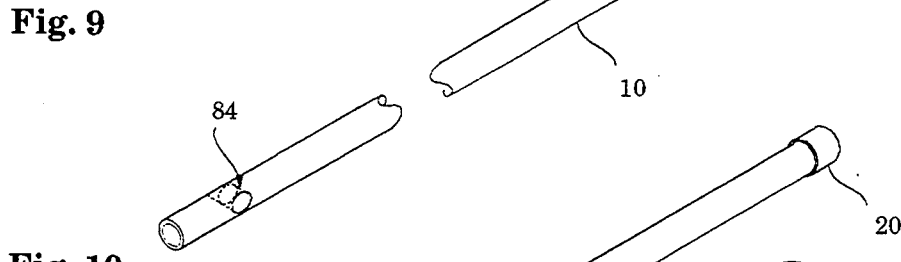
FIG. 10 is an isometric view showing a third alternative embodiment of the handle for connecting the rim thereto for a dip net apparatus as shown in FIG. 1.

FIG. 10 illustrates a third alternative embodiment for connecting the rim 12 to the handle 10. An elliptical tube 84 is inserted through and attached to the tubular wall of the handle 10, flush with the outer surface of the handle 10, to provide locking connection points for both ends of the rim 12.

Figure 11:
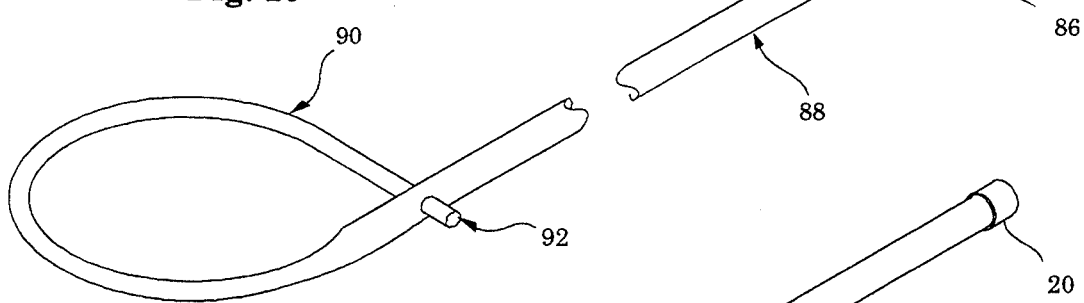
FIG. 11 is an isometric view showing an embodiment of a combined handle and rim for a dip net apparatus as shown in FIG. 1.

FIG. 11 illustrates an embodiment for a frame 86 combining a rim and handle. The handle portion 88 narrows to a rim portion 90 having a smaller diameter than the handle portion 88. Two holes 92 are fashioned in the tubular wall of the handle portion 88 to provide a locking connection for the rim portion 90.

Figure 12:
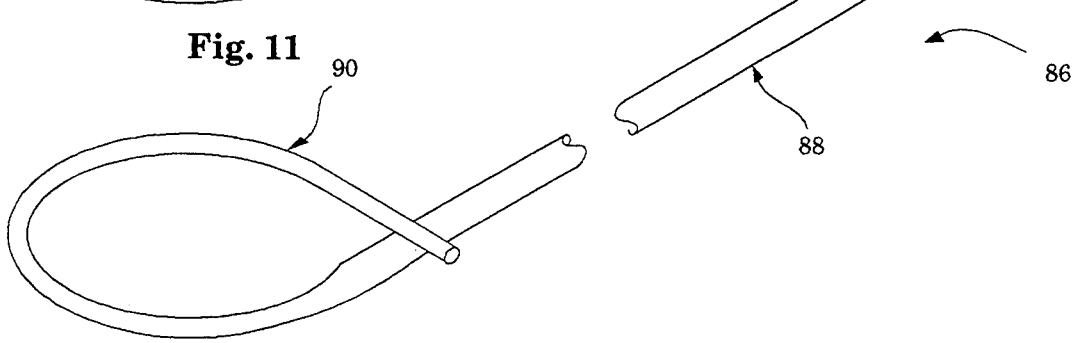
FIG. 12 is an isometric view showing a second alternative embodiment of a combined handle and rim for a dip net apparatus as shown in FIG. 1.

FIG. 12 illustrates a similar alternative embodiment for a frame 86. The preformed character of the rim portion 90 defines a somewhat circular shape even though no attachment is provided to the handle portion 88.

Figure 13:
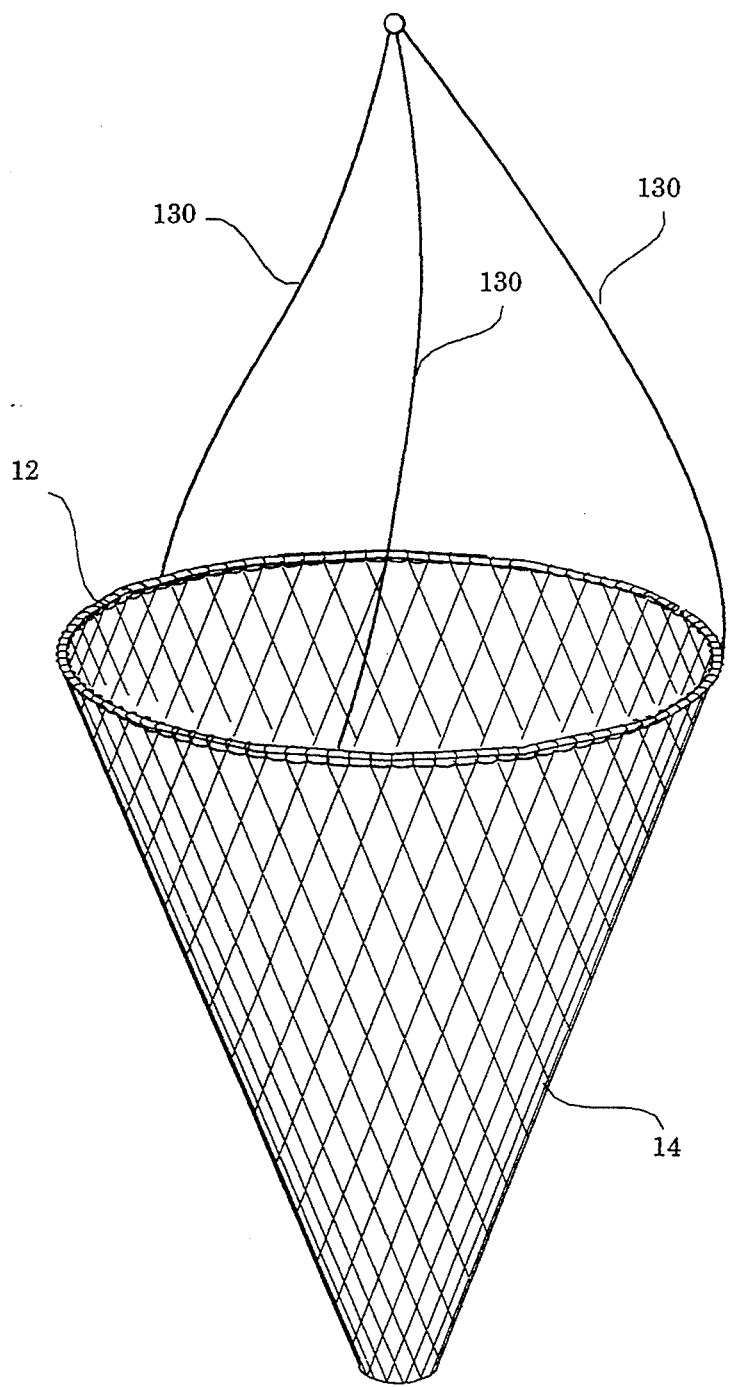
FIG. 13 is an isometric view showing an embodiment of a dip net apparatus having no handle.

FIG. 13 illustrates an embodiment for a dip net apparatus without any handle. A group of tethers 130 connect to the rim 12 and join together to provide a means to lift such a net (together with the caught fish) from the water.

Figure 14:
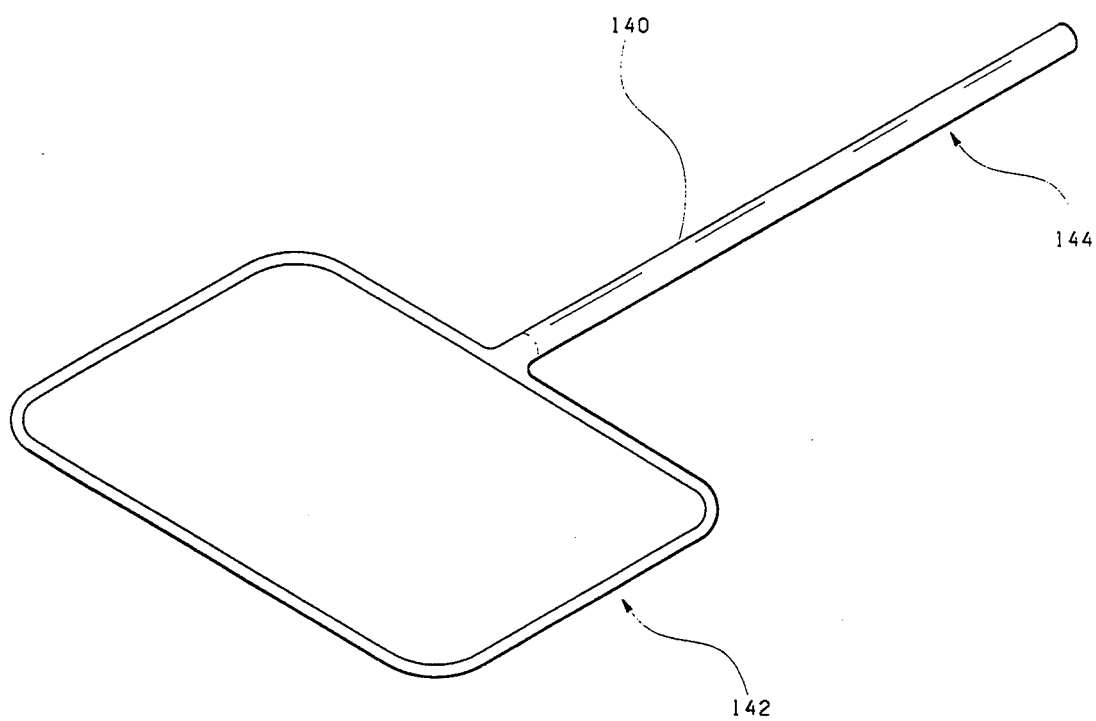
FIG. 14 is an isometric view of a dip net apparatus having a frame including a rim portion having a substantially rectangular shape.

FIG. 14 illustrates a single piece frame 140 having a rim portion 142 of a substantially rectangular shape and a handle portion 144. Such a frame is particularly useful for smaller implementations of the instant invention, such as might be desirable for use with aquariums and bait tanks.

Figure 15:
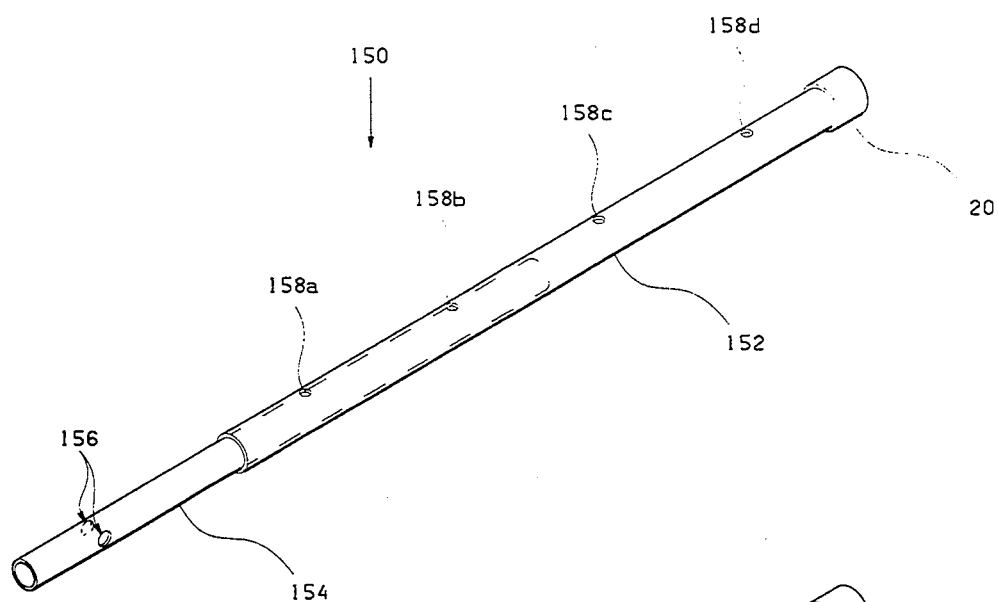
FIG. 15 is an isometric view of a dip net apparatus having an adjustable length handle.

FIG. 15 illustrates an adjustable length handle 150 for use with the current invention. An inner rod 154 telescopes within an outer rod 152 and may be secured by a spring-loaded locking pin arrangement (not shown) engaged into one of a series of holes 158a–158d. An end cap 20 covers one end of the outer rod 152. The cross-sectional shape of both inner and outer rods may be circular, elliptical, square, or any of a variety of other convenient shapes. The two holes 156 provide for the attachment of a rim 12 to the inner rod 154, as discussed previously. These holes 156 may be elliptical or another out-of-round shape to afford torsional stability to an attached rim 12 of a corresponding cross-sectional shape.

Figure 16:
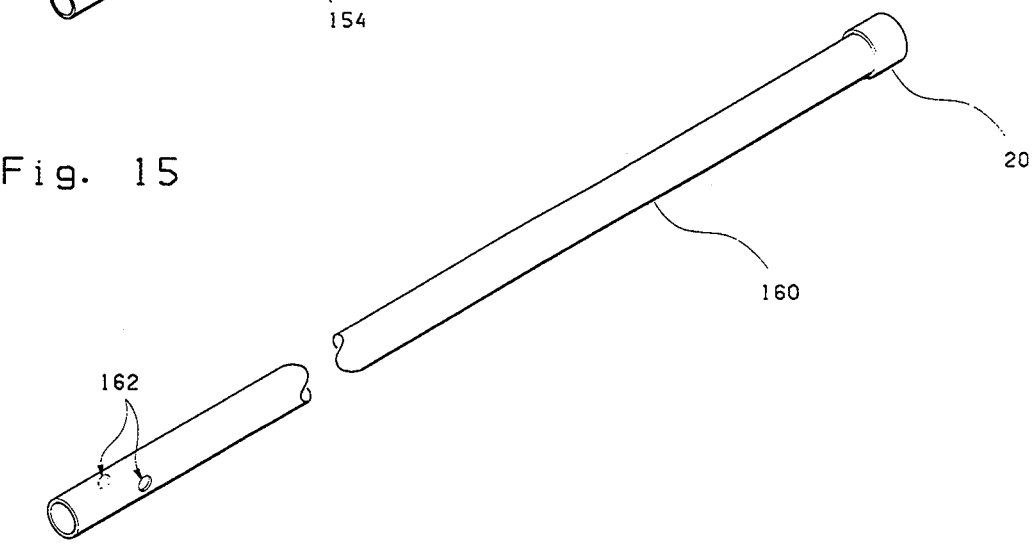
FIG. 16 is an isometric view showing an embodiment of a handle for connecting the rim thereto which utilizes two out-of-round holes asymmetrical to the axis of the handle.

FIG. 16 is an isometric view showing an embodiment of a handle 160 for connecting the rim 12 thereto which utilizes two out-of-round holes 162 (as does the handle of FIG. 8), but asymmetrical to the longitudinal axis of the handle 160. This affords even more rigidity to the rim 12 when inserted, as each end of the rim 12 passes through one of the holes 162 and fully through the interior of the handle 160 to contact the inner wall opposite the hole, and further ensures that air within the rim 12 has adequate clearance to escape when submerged, thus filling the rim 12 with water.

Figure 17:
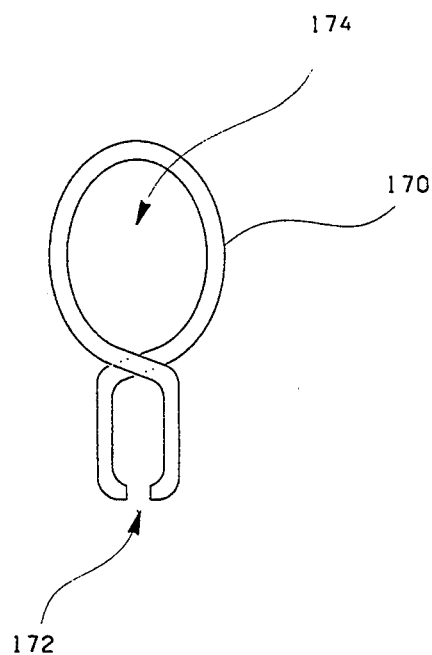
FIG. 17 illustrates a side view of a clip useful for attaching a net to a rim.

FIG. 17 illustrates a side view of a fastener or clip useful for attaching a net to a rim 12. A clip 170 is attached to the net 14 by forcing the jaws 172 open and inserting the net thereinto. A number of such clips attached to the perimeter of the open end of the net 14 forms a sleeve through respective openings 174 of each clip through which a rim 12 may pass.

Figure 18:
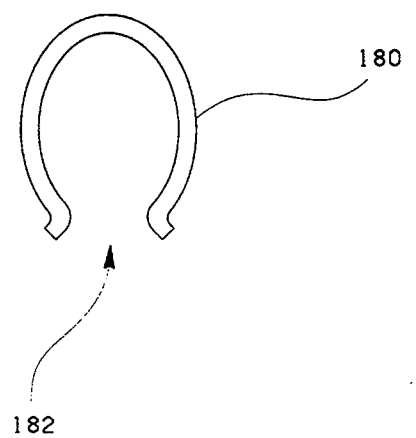
FIG. 18 illustrates a side view of an alternate clip for attaching a net to the rim.

FIG. 18 illustrates a side view of an alternate fastener for attaching a net 14 to the rim 12. The perimeter region of the open end of the net 14 is placed around the rim 12 and the clip 180 is pressed into place around the net by forcing the net and rim through the jaws 182 of the clip 180. A number of such clips 180 may be used to secure the net to the rim, or alternatively, a long clip (e.g. an extruded or injection molded clip) having a cross-sectional shape the same as clip 180 (when viewed from the side) may be employed to provide a continuous attachment of the net to the rim.

While the invention has been described with respect to the embodiments set forth above, the invention is not necessarily limited to these embodiments. For example, the invention is not necessarily limited to implementation using hollow tubing. A rim of solid, transparent tubing affords a dip net apparatus with many of the advantages disclosed herein. While the out-of-round nature of the rim 12 described in these embodiments afford a dip net apparatus that is assembled with no hand tools, alternatively, other arrangements may be used. For example, a round, tapered rim 12 may be used to achieve a press-fit of the rim into the handle 10 or the Y-connector 16. Alternatively, small locking parts may be employed with a variety of cross-sectional shapes, including a circular shape. These locking parts need not necessarily be non-opaque.

Many of the various improvements disclosed herein may be combined in a variety of ways to achieve an improved net. For example, a non-opaque net, such as a monofilament polypropylene net, may be advantageously combined with an ordinary rim. Similarly, a non-opaque rim and or handle may be advantageously combined with an ordinary net to achieve superior results than with previous nets. In either case, it is believed that such a net poses less of a threat to the fish than ordinary nets.

Accordingly, other embodiments, variations, and improvements not described herein are not necessarily excluded from the scope of the invention, which is defined by the following claims.

What is claimed is:

1. An apparatus for supporting a net, comprising:
a frame having a substantial portion thereof substantially non-opaque; and
an elongated handle connected to the frame;
wherein a portion of the handle is substantially non-opaque.

2. An apparatus as in claim 1:
wherein a portion of the frame is hollow; and further comprising means for filling the hollow interior of the rim with a fluid when submerged therewithin.

3. An apparatus as in claim 2 wherein a substantial portion of the frame is hollow.

4. An apparatus as in claim 3:
wherein a portion of the handle is hollow; and further comprising means for filling the hollow interior of the handle with a fluid when submerged therewithin.

5. An apparatus as in claim 4 wherein a substantial portion of the handle is hollow.

6. A net suitable for attachment to a frame comprising:
netting material having a pocket shape with an open end; and
a sleeve disposed at the perimeter of the open end;
wherein the netting material is substantially non-opaque; and
wherein the sleeve comprises a plurality of loops attached to the netting material.

7. A dip net apparatus for catching aquatic animals comprising:
a frame having a rim portion thereof; and
a net attached to the rim portion of the frame;
wherein a substantial portion of the rim portion of the frame is substantially non-opaque.

8. An apparatus as in claim 7:
wherein the rim portion of the frame is substantially hollow; and wherein the frame includes an opening into the hollow interior of the rim portion for providing a path for water to fill the hollow interior of the rim portion when submerged below water.

9. An apparatus as in claim 7 wherein the frame further includes an elongated handle portion thereof.

10. An apparatus as in claim 7 wherein the frame consists of a handle-less rim.

11. An apparatus as in claim 9 wherein a portion of the handle portion of the frame is substantially non-opaque.

12. An apparatus as in claim 11:
wherein the rim portion is substantially hollow;
wherein the frame includes an opening into the hollow interior of the rim portion for providing a path for water to fill the hollow interior of the rim portion when submerged below water;
wherein the handle portion is hollow; and
wherein the frame includes an opening into the hollow interior of the handle portion for providing a path for water to fill the hollow interior of the handle portion when submerged below water.

13. An apparatus as in claim 7 wherein the net is attached to the rim portion of the frame by at least one fastener attached to the net.

14. An apparatus as in claim 7 wherein the net is comprised of a substantially non-opaque netting material.

15. An apparatus as in claim 4 wherein the netting material contains a pure plastic resin absent any added color.

16. An apparatus as in claim 15 wherein the netting material comprises a monofilament netting material.

17. An apparatus as in claim 15 wherein the netting material is chosen from the group consisting of polypropylene and nylon.

18. An apparatus as in claim 7 wherein the frame comprises a plastic material.

19. An apparatus as in claim 18 wherein the frame comprises a material chosen from the group consisting of polycarbonate, plexiglas, and acrylic plastic.

20. A dip net apparatus for catching aquatic animals comprising:
an elongated handle having a longitudinal axis;
a rim removably attached to the handle by each of two ends of the rim;
a net removably attached to the rim;
wherein a substantial portion of the rim is substantially non-opaque.

21. A dip net apparatus as in claim 20:
wherein the rim is hollow; and
wherein the rim includes an opening for providing a path, when attached to the handle, for water to fill the hollow interior of the rim when submerged therebelow.

22. A dip net apparatus as in claim 20:
wherein the rim has an out-of-round cross-section and further having two ends thereof; and
wherein the handle has two openings, each having an out-of-round cross-section suitable for receiving one end of the rim thereinto.

23. A dip net apparatus as in claim 20 wherein the two openings of the handle are symmetrical with respect to the longitudinal axis of the handle.

24. A dip net apparatus as in claim 20 wherein the two openings of the handle are asymmetrical with respect to the longitudinal axis of the handle.

25. A dip net apparatus as in claim 22 wherein the out-of-round cross section of the rim is an elliptical cross-section.

26. A dip net apparatus as in claim 22 wherein the out-of-round cross section of the rim is a rectilinear cross-section.

27. A dip net apparatus as in claim 20 wherein the handle and the rim each comprise a material chosen from the group consisting of polycarbonate, plexiglas, and acrylic plastic.

28. A netting apparatus comprising:
a pocket of netting material having an opening;
a light penetrable frame portion having a shape that substantially defines the pocket opening, the netting material being attached to the frame portion in proximity to the pocket opening; and
a sleeve disposed at the pocket opening of the netting material, the frame portion being disposed in the sleeve.

29. A netting apparatus comprising:
a pocket of netting material having an opening;
a light penetrable frame portion having a shape that substantially defines the pocket opening, the netting material being attached to the frame portion in proximity to the pocket opening; and
a plurality of hoops passing about the frame portion and connected to the netting material at the pocket opening.

30. A netting apparatus comprising:
a pocket of netting material having an opening;
a light penetrable frame portion having a shape that substantially defines the pocket opening, the netting material being attached to the frame portion in proximity to the pocket opening; and
a plurality of clips passing about the frame portion and connected to the netting material at the pocket opening.

* * * * *